United States Patent [19]

Lary

[11] Patent Number: 5,499,253
[45] Date of Patent: Mar. 12, 1996

[54] SYSTEM AND METHOD FOR CALCULATING RAID 6 CHECK CODES

[75] Inventor: Richard F. Lary, Colorado Springs, Colo.

[73] Assignee: Digital Equipment Corporation, Maynard, Mass.

[21] Appl. No.: 177,563

[22] Filed: Jan. 5, 1994

[51] Int. Cl.$^6$ .................................................. G06F 11/00
[52] U.S. Cl. ........................................ 371/40.1; 395/441
[58] Field of Search ................................ 371/37.1, 40.1, 371/40.2, 10.2, 40.4, 10.1, 49.1; 395/439, 441

[56] References Cited

U.S. PATENT DOCUMENTS

| | | | |
|---|---|---|---|
| 5,195,100 | 3/1993 | Katz et al. | 371/66 |
| 5,265,098 | 11/1993 | Mattson et al. | 371/11.1 |
| 5,301,297 | 4/1994 | Menon et al. | 395/425 |
| 5,303,244 | 4/1994 | Watson | 371/10.1 |
| 5,309,451 | 5/1994 | Noya et al. | 371/40.4 |

OTHER PUBLICATIONS

The RAID Advisory Board, Lino Lakes, MN, Apr. 1993, The RAID Book; A Source Book for RAID Technology.
"A Case For Redundant Tarrays of Inexpensive Disks (RAID)" ACM SIGMOND Conference, Chicago, Ill., Patterson et al., pp. 109–116, Jun. 1, 1988.

*Primary Examiner*—Paul P. Gordon
*Attorney, Agent, or Firm*—Arthur W. Fisher; Ronald C. Hudgens

[57] ABSTRACT

Systems and methods for performing the check code calculations for RAID 6 computer mass storage arrays are disclosed such that it becomes computationally feasible to implement a RAID 6 system in software on a modern high-speed computer. For a standard "P+Q" RAID 6 array, the system and method of the present invention allow the calculation of both RAID 6 check codes in less than twice the time it takes to calculate simple RAID 5 parity. The system and method of the present invention are based on a careful matching of the characteristics of the Commutative Ring in which calculations take place to the capabilities of modern high-speed computers. In a particular embodiment, defining the mapping of data and check symbols to computer storage locations in a transposed manner affords a further reduction of computation time.

51 Claims, 8 Drawing Sheets

Fig_1

Fig_2

Fig_3

Fig_4a  (A)        (a)

Fig_4b

Fig. 4c

Fig_4d

Fig_5

SYSTEM AND METHOD FOR CALCULATING RAID 6 CHECK CODES

BACKGROUND

The present invention relates, in general, to the field of systems and methods for calculating RAID 6 check codes. More particularly, the present invention relates to an efficient system and method for performing the check code calculations for RAID 6 computer mass storage systems in such a manner that it becomes computationally feasible to implement a RAID 6 system in software on a modern high-speed computer by careful matching of the characteristics of the Commutative Ring in which calculations take place with the capabilities of the computer.

RAID stands for Redundant Array of Independent Disks and is a taxonomy of redundant disk storage schemes which define a number of ways of configuring and using multiple computer disk drives to achieve varying levels of availability, performance, capacity and cost while appearing to the software application as a single large capacity drive. Various RAID levels have been defined from RAID 0 to RAID 6, each offering tradeoffs in the previously mentioned factors. RAID 0 is nothing more than traditional striping in which user data is broken into chunks which are stored onto the stripe set by being spread across multiple disks with no data redundancy. RAID 1 is equivalent to conventional "shadowing" or "mirroring" techniques and is the simplest method of achieving data redundancy by having, for each disk, another containing the same data and writing to both disks simultaneously. The combination of RAID 0 and RAID 1 is typically referred to as RAID 0+1 and is implemented by striping shadow sets resulting in the relative performance advantages of both RAID levels. RAID 2, which utilizes Hamming Code written across the members of the RAID set is not now considered to be of significant importance.

In RAID 3, data is striped across a set of disks with the addition of a separate dedicated drive to hold parity data. The parity data is calculated dynamically as user data is written to the other disks to allow reconstruction of the original user data if a drive fails without requiring replication of the data bit-for-bit. Error detection and correction codes ("ECC") such as exclusive OR ("XOR") or more sophisticated Reed-Solomon techniques may be used to perform the necessary mathematical calculations on the binary data to produce the parity information in RAID 3 and higher level implementations. While parity allows the reconstruction of the user data in the event of a drive failure, the speed of such reconstruction is a function of system workload and the particular algorithm used.

As with RAID 3, the RAID scheme known as RAID 4 consists of N data disks and one parity disk wherein the parity disk sectors contain the bitwise XOR of the corresponding sectors on each data disk. This allows the contents of the data in the RAID set to survive the failure of any one disk. RAID 5 is a modification of RAID 4 which stripes or "diagonalizes" the parity across all of the disks in the array in order to statistically equalize the load on the disks. In RAID 4 and RAID 5 implementations, insufficient data is received to enable parity to be calculated solely from the incoming data, as is the case with RAID 3. Therefore, the array controller or RAID software must combine new data with old data and existing parity data to produce the new parity data, requiring each RAID write to include a read from two drives (old data, old parity), the calculation of the difference between the new and old data, the application of that difference to the old parity to obtain the new parity, and the writing of the new data and parity back onto the same two drives.

The designation of RAID 6 has been used colloquially to describe RAID schemes which can withstand the failure of two disks without losing data through the use of two parity drives (commonly referred to as the "P" and "Q" drives) for redundancy and sophisticated ECC techniques. Data and ECC information are striped across all members of the RAID set and write performance is generally worse than with RAID 5 because three separate drives must each be accessed twice during writes. In the following description, RAID 6 will be treated as if it were an extension of RAID 4; the RAID 5 diagonalization process obviously can be applied as well.

With respect to the previously described levels, RAID storage subsystems can be implemented in either hardware or software. In the former instance, the RAID algorithms are packaged into separate controller hardware coupled to the computer input/output ("I/O") bus and, although adding little or no central processing unit ("CPU") overhead, the additional hardware required nevertheless adds to the overall system cost. On the other hand, software implementations incorporate the RAID algorithms into system software executed by the main processor together with the operating system, obviating the need and cost of a separate hardware controller, yet adding to CPU overhead.

All currently described RAID 6 schemes have been implemented using specialized hardware to calculate multiple orthogonal arithmetic check (parity) codes on the data disks; these check codes are stored on a set of check disks, and are used to reconstruct data in the event that one or more data disks (or check disks) fail. In order to fully appreciate the difficulties encountered, it is useful to briefly describe the type of arithmetic used in these calculations.

A Commutative Ring (hereinafter "Ring") consists of a set of elements plus a pair of operators on the members of the set which behave more-or-less like addition and multiplication under the integers, namely:

1. The set is closed under both operators (if $\alpha$ and $\beta$ are members so are $\alpha+\beta$ and $\alpha*\beta$)
2. Both operators are commutative ($\alpha+\beta=\beta+\alpha$, $\alpha*\beta=\beta*\alpha$)
3. Both operators are associative ($\alpha+[\beta+\gamma]=[\alpha+\beta]+\gamma$, $\alpha*[\beta*\gamma]=[\alpha*\beta]*\gamma$)
4. Each operator has a unique identity element ($\alpha+0=\alpha$, $\alpha*1=\alpha$)
5. Multiplication distributes across addition ($\alpha*[\beta+\gamma]=\alpha*\beta+\alpha*\gamma$)
6. Every element $\alpha$ has a unique additive inverse $-\alpha$ such that $\alpha+(-\alpha)=0$.

If every non-zero element $\delta$ in the Ring has a multiplicative inverse $\delta^{-1}$, such that $\delta*\delta^{-1}=1$, then the Ring is called a Field.

The integers, for example, form an infinite Ring under normal addition and multiplication, but not a Field, since (for example) the integer 2 has no multiplicative inverse. The integers do form something called a Euclidean Ring, which is a Ring with a unique "division with remainder" that can be performed on any two elements in the Ring. This fact allows one to construct finite rings of integers based on the remainders the integers leave with respect to some fixed integer; this is known as the Ring of integers Modulo M, where M is the Modulus of the Ring. The elements of this Ring are the integers from 0 to M−1, and the operations of addition and multiplication in such a Ring are all done Modulo M. If $0<x<M$ and x and M are relatively prime (meaning they have no common remainderless divisor other than 1) then x has a multiplicative inverse in the Ring of integers Modulo M. Therefore, if M is a prime number, every non-zero element of the Ring of integers Modulo M has a multiplicative inverse, and so the integers form a Field Modulo M. This field is known as the Galois Field Modulo M, or GF(M). The smallest such Field is GF(2), and consists of the integers 0 and 1; addition in this Field looks like Boolean XOR, and multiplication looks like Boolean AND.

Polynomials are functions of a variable X of the form:

$$C_0+C_1*X+C_2*X^2+C_3*X^3+\ldots+C_N*X^N$$

where $C_i$ represents the coefficients of the polynomial and N, the highest exponent of X with a non-zero coefficient, is called the degree of the polynomial. Given any Field, the set of polynomials with coefficients in that Field forms an infinite Ring under the operations of polynomial addition and polynomial multiplication with the coefficients combined according to the rules of the underlying Field. Furthermore, this Ring is Euclidean, that is, two polynomials can be divided to obtain a unique quotient and remainder. Therefore, the set of polynomials Modulo some polynomial G forms a finite Ring, and G is known as the Generator polynomial of that Ring. If G is an irreducible polynomial of degree N over an underlying Galois Field GF(M) (i.e. it cannot be represented as a product of smaller polynomials with coefficients in that Field) then every non-zero element of the Ring of polynomials generated by G has a multiplicative inverse, and those polynomials form a Galois Field known as $GF(M^N)$.

The arithmetic used in all current RAID 6 hardware implementations takes place in $GF(2^N)$. This is the field of polynomials with coefficients in GF(2), modulo some generator polynomial of degree N. All the polynomials in this field are of degree N–1 or less, and their coefficients are all either 0 or 1, which means they can be represented by a vector of N coefficients all in {0,1}; that is, these polynomials "look" just like N-bit binary numbers. Polynomial addition in this Field is simply N-bit XOR, which has the property that every element of the Field is its own additive inverse, so addition and subtraction are the same operation. Polynomial multiplication in this Field, however, is more complicated as it involves performing an "ordinary" polynomial multiplication, then dividing the result by the Generator polynomial to get the remainder. Despite the computational difficulties involved, this is the simplest multiplication operation whose range and domain cover the entire set of N-bit binary numbers and which distributes with an N-bit addition operation. Software implementations generally find it easier to implement multiplication by a table lookup method analogous to logarithms.

Calculating multiplicative inverses in $GF(2^N)$ is extremely difficult, and in general cannot be expressed algorithmically; instead, table lookup techniques based on logarithms must be used.

RAID 6 check codes are presently generated in hardware by taking a set $\{d_k\}$ of N-bit data symbols, one from each data disk, and deriving a set of check symbols $\{s_i\}$ in $GF(2^N)$ of the form:

$$s_i = \Sigma d_k*(\sigma_i)^k \quad (k=0 \text{ to Numdisks}-1)$$

where $\sigma_i$ is a unique "seed" that generates the $i^{th}$ check code. One of the seeds is generally set to the value 1 (i.e. the degree 0 polynomial "1", the multiplicative identity of $GF(2^N)$) so that its corresponding check code is equal to $\Sigma$ $d_k$ or the simple XOR of the data disks; that is, RAID 5 "parity" is a special case of these calculations.

Each RAID 6 check code expresses an invariant relationship, or equation, between the data on the data disks of the RAID 6 array and the data on one of the check disks. If there are C check codes and a set of F disks fail, F≤C, the failed disks can be reconstructed by selecting F of these equations and solving them simultaneously in $GF(2^N)$ for the F missing variables. In RAID 6 systems implemented or contemplated today there are only 2 check disks— check disk P, with "seed" 1, and check disk Q, with some "seed" α—and four double-failure cases:

1. Data disk j and the Q check disk fail; restore data disk j via the formula:

$$d_j = P + \Sigma d_k$$

where the sum does not include the $j^{th}$ data disk; then reconstruct Q. This is just like a RAID 5 reconstruction, plus reconstructing Q.

2. Data disk j and the P check disk fail; restore data disk j via the formula:

$$d_j = (Q + \Sigma d_k*\alpha^k)*(\alpha^j)^{-1}$$

where the sum does not include the $j^{th}$ data disk; then reconstruct P.

3. Data disks i and j fail; set up the following two simultaneous equations:

$$d_i + d_j = P + \Sigma d_k = A$$

$$d_i*\alpha^i + d_j*\alpha^j = Q + \Sigma d_k*\alpha^k = B$$

(where the sums do not include the $i^{th}$ and $j^{th}$ data disks) and solve them for $d_i$ and $d_j$:

$$d_i = (A*\alpha^j + B)*(\alpha^i + \alpha^j)^{-1}$$

$$d_j = (A*\alpha^i + B)*(\alpha^i + \alpha^j)^{-1} = A + d_i$$

4. The P and Q check disks fail; reconstruct them from the data disks.

Once initialized, RAID check codes are generally computed incrementally; in the RAID 6 case discussed above, if data on one disk of the RAID 6 set is being updated then the difference Δ of the old data and new data on that disk is computed and the P and Q check codes are updated as follows:

$$P = P + \Delta$$

$$Q = Q + \Delta*\alpha^k$$

Where K is the index of the disk being updated i.e. its position within the RAID 6 set.

Hardware RAID 6 implementations generally pick N, the degree of the generating polynomial of the Galois Field, as small as possible, in order to perform the difficult $GF(2^N)$ arithmetic operations (multiply and inverse) via table lookups. This also minimizes the width of the specialized hardware data paths that perform the arithmetic in $GF(2^N)$. The minimum value for N is a function of the maximum number of data disks desired in the RAID 6 array; that is, N must be large enough so that $\alpha^k$ has a distinct value for every data disk index k, else for some pair of data disks i and j, $\alpha^i + \alpha^j = 0$ and the simultaneous equations of the previous section won't be solvable when those two disks fail. With proper choices of the generating polynomial (a "primitive" polynomial) and of α, a $GF(2^N)$ implementation can support a RAID 6 array with $2^N-1$ data disks.

However, while a small value of N is a good choice for hardware implementations of RAID 6, it can cause severe computational problems with software implementations of RAID 6. For example, a RAID 6 array with N=4 (a common hardware implementation allowing up to 15 data disks) would require software to perform 1024 multiplies and adds in $GF(2^4)$ plus the ancillary bit field unpacking and packing operations per 512-byte sector written, just to update the Q check disk. It is this operation of updating the Q check disk during normal writes that is by far the dominant computational cost of a software RAID 6 implementation, although it is also important to keep the computational cost of data reconstruction manageable.

SUMMARY OF THE INVENTION

Given that a small N is unacceptable for a software RAID 6 implementation, the present invention contemplates the novel and non-obvious choice of utilizing an even larger value of N. As an illustrative example, by setting N=64, data can be processed in 64-bit symbols on machines that support a 64-bit data type, like the Alpha AXP™ available from Digital Equipment Corporation, assignee of the present invention. The obvious problems to be anticipated in the selection of a large value for N are that multiplication becomes considerably more compute intensive, and table lookups will not work due to the impractical size (264 entries) of the tables; furthermore, finding the inverse of an element becomes exceedingly difficult. However:

1. If the second "seed" is selected as $\alpha=2$, that is, the degree 1 polynomial "X", then multiplying by $\alpha$ in $GF(2^{64})$ consists of shifting the multiplicand left 1 bit, and then XORing a constant into the result if there was a carry out of the shift. The constant to XOR is the generating polynomial G less its $X^{64}$ term, i.e. $G+X^{64}$. A multiplication by $\alpha^j$ (i.e. the degree j polynomial "$X^j$") is a shift left of j bits followed by an XOR of a value from a table indexed by the j bits that were shifted off the high end; this table is created in much the same way that a "fast software CRC" table is created. This reduces the size of the table needed for multiplication from $2^{64}$ to $2^M$, where M is the number of data disks in the RAID 6 array.

2. If a good generating polynomial is also selected, then multiplying by $X^j$ can be performed efficiently without table lookups at all for "reasonable" values of j. The properties of a good generating polynomial G are:

a) $G+X^{64}$ should be of minimal degree; i.e. there should be a large "gap" in the polynomial after the highest-order term. If the degree of $G+X^{64}$ is D, then a multiplication by any $X^j$ where j<64–D can be done by shifting the multiplicand left j bits, multiplying the overflow bits (as a polynomial, of course) by $G+X^{64}$, and XORing the product into the shifted multiplicand. Because the overflow bits are a polynomial of degree less than 64–D, the product has degree less than 64 and therefore no "modulus" operations are needed; since $G+X^{64}$ is a constant, the multiply and XOR become a simple series of shifts and XORs.

b) G (and, by implication, $G+X^{64}$) should have a minimal number of non-zero terms. This is to minimize the number of shift-and-XOR steps in the multiplication by $G+X^{64}$. As the simplest example of this, consider the polynomial Ring defined by the generator $G=X^{64}+1$; a multiply by $X^j$ in this Ring is simply a left rotate of j bits. Unfortunately, $X^{64}+1$ is not irreducible, so this Ring is not a Field and simultaneous equations can not be solved in it. In fact, no polynomial of degree 64 with two, three, or four non-zero terms is irreducible. This means that a multiply by $G+X^{64}$ with G irreducible requires at least four shift-and-XOR steps.

3. Computing general inverses in $GF(2^{64})$ is extremely difficult. However, such general computations need not be done because, in observing the equations for reconstructing $d_i$, there are only two types of polynomials being inverted: $X^j$ and $(X^j+X^k)$. If the number of data disks in the RAID 6 set is limited to M (where, from the simplification in (2)a, $M \leq 64 -D$) then there are a total of M(M+1)/2, i.e. less than 2100 inverses to store in a table. This reduces each solution of the simultaneous equations (in the worst case, when two data disks fail) to M multiplies by powers of 2, 2M XOR's, and one general multiply by a polynomial modulo G (which consists of 128 shift-test-XOR cycles). In light of the relative infrequency of double disk failures, this should be an acceptable compute penalty, and there are ways to trade-off extra memory space (for larger inverse tables) for reduced compute time in the general multiply, as well.

4. For a given failure recovery operation on the RAID 6 array the polynomial to be inverted ($X^j$ or $(X^j+X^k)$) will be the same for every set of symbols to be recovered. Advantage can be made of this by pre-processing the inverse obtained from the above-mentioned inverse table into a multiplication accelerator table to reduce the number of instructions executed in each general multiplication, by a process similar to that used to generate a "fast software CRC" table. For instance, the number of Alpha AXP™ instructions needed to perform a general 64-bit polynomial multiply in $GF(2^{64})$ is reduced from approximately 320 for the "bit-by-bit" method to approximately 40 with a 1024-entry multiplication accelerator table.

5. Because of the limited number of Field elements whose inverses are needed, one need not be restricted to Galois Fields of polynomials. Rings of polynomials modulo a reducible generator G, in which some non-zero elements do not have inverses, may be considered as long as all elements of the form $X^j$ or $(X^j+X^k)$ do have inverses. This relaxes the constraint on G from "G must be irreducible" to "G must be relatively prime to all polynomials of the form $X^j$ and $(X^j+X^k)$ for j<k<64–D" where D is the degree of $G+X^{64}$. The set of polynomials formed by this G is not a Galois Field, but it is a Useful Ring of order 64 over GF(2), or "$UR(2^{64})$" for short. Generator Polynomials for $UR(2^{64})$ exist of the form $G=X^{64}+X^D+1$. For those polynomials, $G+X^{64}$ has only two non-zero terms as opposed to a minimum of five non-zero terms for gen. pols. in section (2)b). The smallest such D is D=4. Corresponding generator polynomials exist for all $UR(2^N)$ where N is a power of 2 and $N \geq 16$.

By means of the preceding non-obvious mechanisms, the computational difficulties involved in using a large (64-bit) symbol size can be overcome. This reduces the number of operations per 512-byte sector needed to compute the Q check code from 1024 (for N=4) to 64 (for N=64) and reduces the complexity of each operation as well.

What has been provided, therefore is a system and method for performing the check code calculations for RAID 6 computer mass storage arrays which render it computationally feasible to implement a RAID 6 storage system in software on a modern high-speed computer. For a standard "P+Q" RAID 6 array, the system and method of the present invention allow the calculation of both the P and Q RAID 6 check codes in less than twice the time it takes to calculate simple RAID 5 parity. The system and method of the present invention are based on a careful matching of the characteristics of the Commutative Ring in which calculations take place to the capabilities of modern high-speed computers.

Specifically disclosed is a system and method for updating RAID 6 check codes by transforming a P check symbol difference to a Q check symbol difference utilizing a generator polynomial of the form $G=X^N+X^D+1$ and an index K as follows: The P check symbol difference is rotated left by K bit positions to define a rotated check symbol difference. The low-order K bits of this rotated check symbol difference are shifted left by D bit positions and exclusive-ORed into the rotated check symbol difference to create the Q check symbol difference.

Also disclosed herein is a computer system including a RAID 6 storage array comprising a plurality of physical storage devices for storing data symbols and P and Q check symbols for reconstructing the data symbols thereon. The computer system further comprises a data processor for recomputing the P and Q check symbols in response to changes in the data symbols. The computer system further comprises means for determining P check symbol differences in response to changes in the data symbols and means for updating the P check symbols based upon the P check symbol differences. The computer system still further comprises means for utilizing a generator polynomial of the form $G=X^N+X^D+1$, means for selecting an index K and means for rotating the P check symbol differences left by K bit positions to define rotated check symbol differences; also, means for isolating the low-order K bits of the rotated check symbol differences, shifting these low-order bits left by D bit positions, and exclusive-ORing the shifted bits with the rotated check symbol differences to produce Q check symbol differences, and means for updating the Q check symbols based upon the Q check symbol differences. Means are also provided for writing the changed data symbols and the P and Q check symbols to the storage array.

BRIEF DESCRIPTION OF THE DRAWINGS

The aforementioned and other features and objects of the present invention and the manner of attaining them will become more apparent, and the invention itself may be best understood by reference to the following description of a preferred embodiment taken in conjunction with the accompanying drawings, wherein.

DESCRIPTION OF PREFERRED EMBODIMENTS

Figure 1:
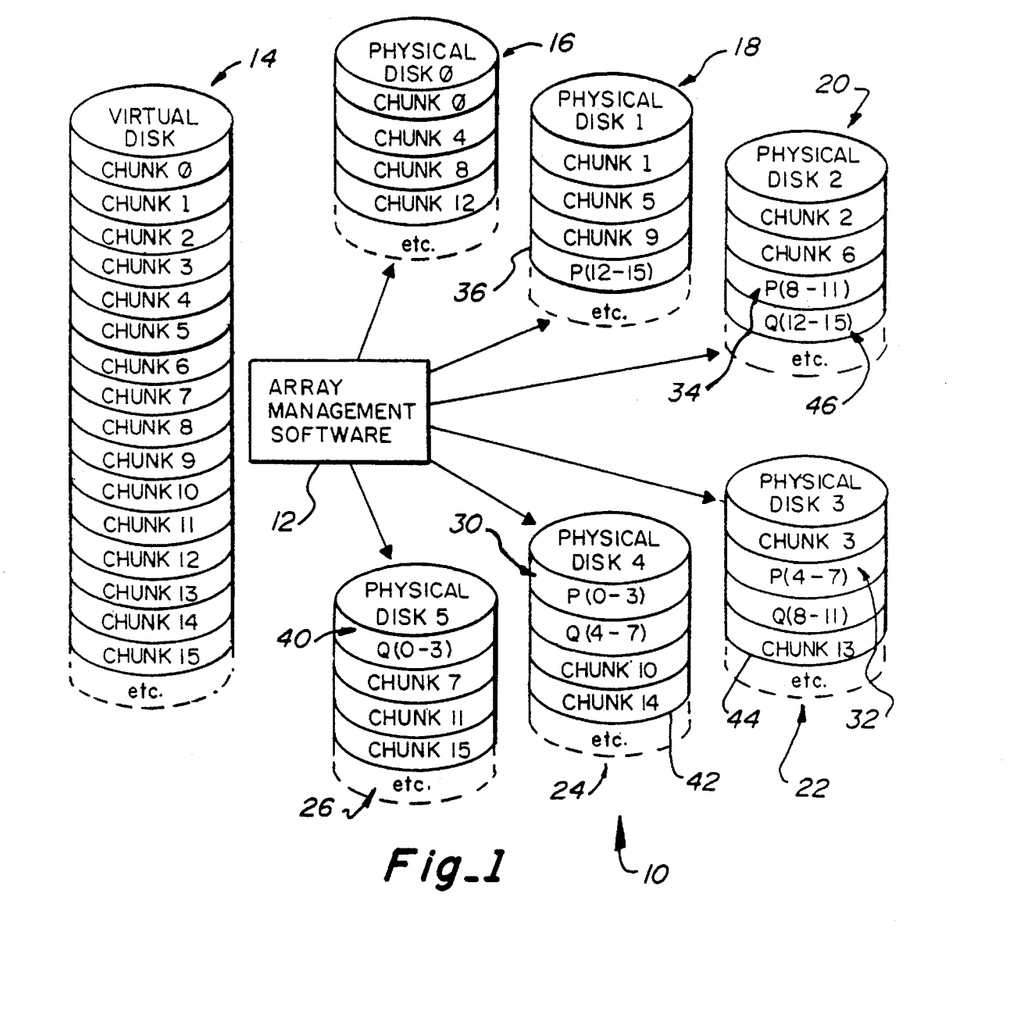
FIG. 1 is a simplified illustration of a possible logical-to-physical mapping for a typical RAID 6 array utilizing, for exemplary purposes only, an array of six physical disks and useful for showing stripes of four data chunks with two parity chunks designated P and Q.

With reference to FIG. 1, a typical logical-to-physical mapping for a RAID 6 array 10 is shown as described in "The RAID Book; A Source Book for RAID Technology" published in 1993 by The RAID Advisory Board, Lino Lakes, Minn. This embodiment comprises an array 10 of, for example, six disk drives 16, 18, 20, 22, 24, 26 storing data divided into chunks numbered chunk 0 through chunk 15 etc., representing those portions of contiguous virtual storage shown with respect to virtual disk 14.

The array management software 12 may reside in a storage controller or in the host computer and functions to map the available storage space onto the physical disks 16–26 and to present the storage represented by the array 10 as one or more virtual disks 14 through conversion of the host input/output ("I/O") requests into requests to the actual physical disks 16–26. In the array 10 shown, the six physical disks are labelled as physical disk (0) 16, physical disk (1) 18, physical disk (2) 20, physical disk (3) 22, physical disk (4) 24 and physical disk (5) 26. Each of the physical disks 16–26 also includes two parity chunks, which, in common RAID 6 nomenclature are labelled "P" and "Q". The P and Q parity chunks are constructed using independent parity computations due to the fact that data protection in the event of multiple physical disk 16–26 failures would render it impossible to reconstruct the contents of the failed drives if the P and Q parity chunks were merely replicated.

In the exemplary illustration shown, physical disk (0) 16 may contain no parity chunks for data chunks 0–15 while physical disk (1) 18 may contain the P(12–15) parity chunk 36 for data chunks 12–15 residing collectively on the other disks in the array [physical disk (0) 16, physical disk (3) 22, physical disk (4) 24 and physical disk (5) 26]. Similarly, physical disk (2) 20 contains the P(8–11) parity chunk 34 for the data resident on physical disk (0) 16, physical disk (1) 18, physical disk (4) 24 and physical disk (5) 26 as well as the Q(12–15) parity chunk 46 for the data chunks residing on physical disk (0) 16, physical disk (3) 22, physical disk (4) 24 and physical disk (5) 26.

In like manner, physical disk (3) may contain the P(4–7) parity chunk 32 and the Q(8–11) parity chunk 44 for the data resident on the other disks of the array 10. Physical disk (4) 24 is shown containing the P(0–3) parity chunk 30 and the Q(4–7) parity chunk 42 while physical disk (5) 26 contains only the Q(0–3) parity chunk 40.

Should one of the physical disks 16–26 of the array 10 fail, either a data chunk or one of the parity chunks 30–46 for each stripe becomes unavailable. In this instance, the regeneration of the data to a replacement drive is similar to that in a RAID 5 array. However, should a second drive fail prior to the regeneration of the data on the first drive which failed, it is still possible to regenerate the data on the two failed drives from the contents of the remaining drives.

As will be more fully described hereinafter, by using two independent parity schemes for the P and Q parity, regeneration of the data on the two failed drives may be effectuated by solving a set of two equations in two unknowns for each pair of data symbols on the two failed drives. In any "P+Q" RAID 6 array, an array having a storage capacity requirement of N physical disks for user data will necessitate the use of N+2 physical disks to accommodate the user data as well as the P and Q parity data. And, although RAID 6 provides for very high data reliability through the use of independent P and Q parity schemes, it requires that both parity blocks be updated for each data block that is written to the array as previously described.

While, for exemplary purposes, the array 10 of FIG. 1 is shown with respect to six physical disks 16–26, through the use of the methods hereinafter described, RAID 6 arrays of up to 60 physical disk drives may be constructed using the method of the present invention while still achieving the advantage of greatly reduced compute overhead during write operations compared to conventional RAID 6 techniques.

Figure 2:
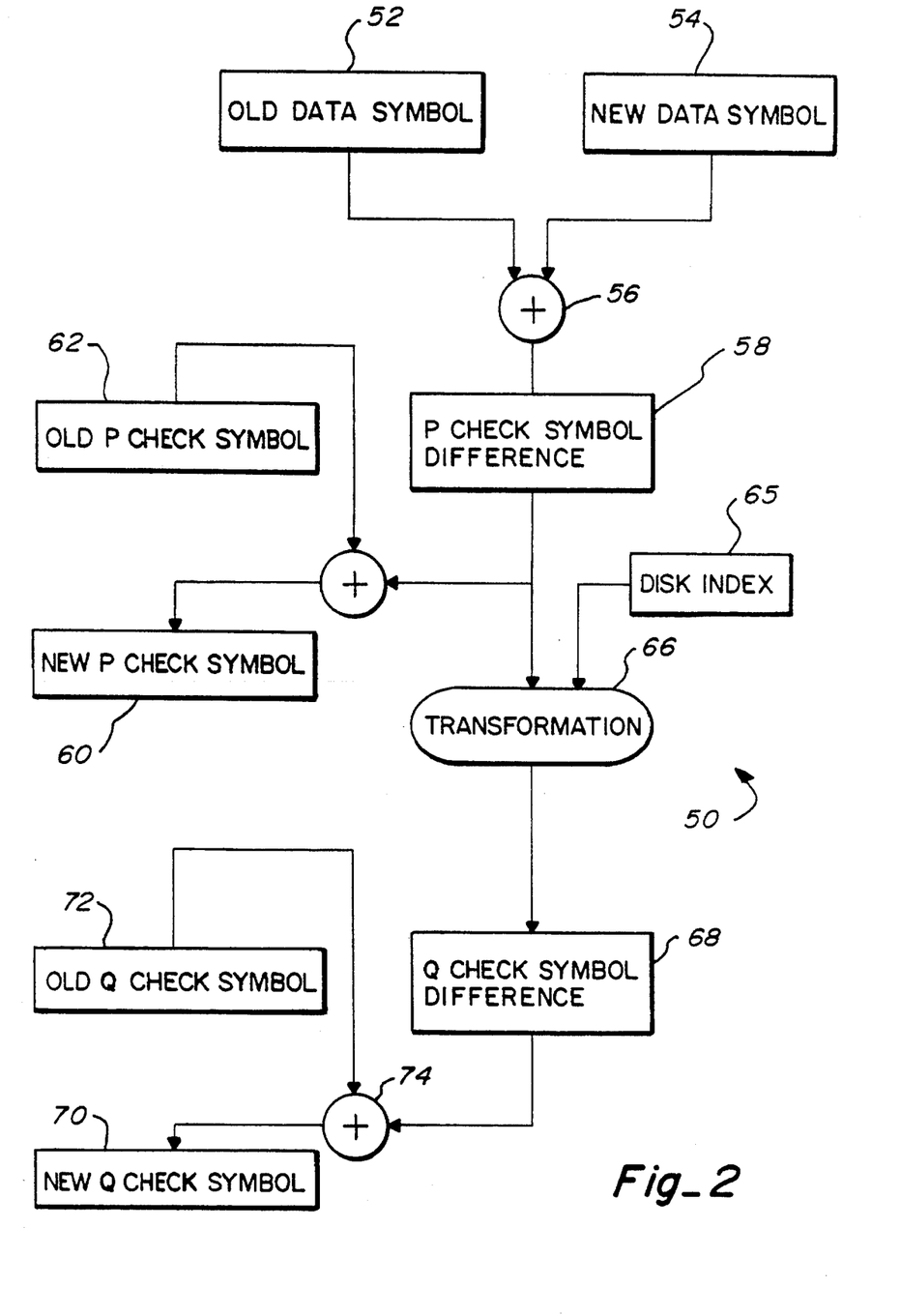
FIG. 2 is a logic flow diagram of a method for calculating RAID 6 P and Q check symbols in accordance with the present invention by means of a transformation operation performed upon the P check symbol difference to derive the Q check symbol difference.

With reference now to FIG. 2, a data flow diagram for a method 50 for updating the P and Q check symbols in a RAID 6 array in accordance with the present invention is shown. The method 50 starts with an exclusive or ("XOR") 56 of an old data symbol 52 (previous data in a sector) with the corresponding new data symbol 54 (new data to be written into the sector). The result is a P check symbol difference 58, and the old P check symbol 62 is updated by an XOR operation 64 with the P check symbol difference 58 to produce the new P check symbol 60.

A transformation operation 66, as will be more fully described hereinafter with respect to FIG. 3 and specific assembly language routines, enables the generation of a Q check symbol difference 68 from the P check symbol difference 58 and the disk index 65 of the data disk being written through the use of the system and methods of the present invention herein disclosed. The Q check symbol difference 68 is then utilized to update the old Q check symbol 72 by an XOR operation 74 producing the new Q check symbol 70.

The new data symbol 54, new P check symbol 60, and new Q check symbol 70 would then be written to the appropriate chunks of the RAID 6 array 10 to complete the RAID 6 write operation.

Figure 3:
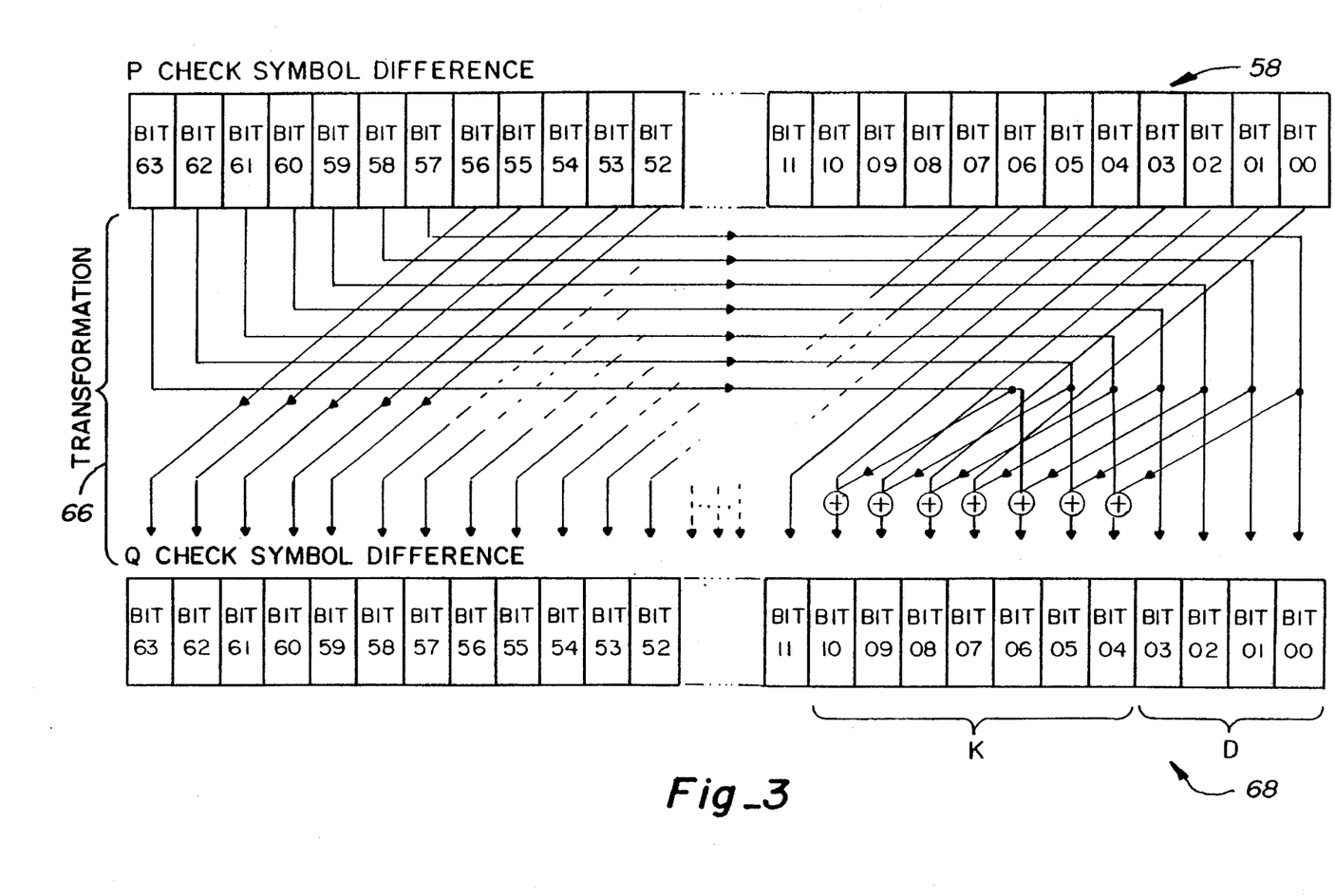
FIG. 3 is a representative illustration of the transformation operation of FIG. 2 for updating the P and Q check symbols for a sector of data using 64 bit symbols in UR($2^{64}$) with a generator polynomial of $X^{64}+X^4+1$, utilizing an index of 7.
Figure 4A:
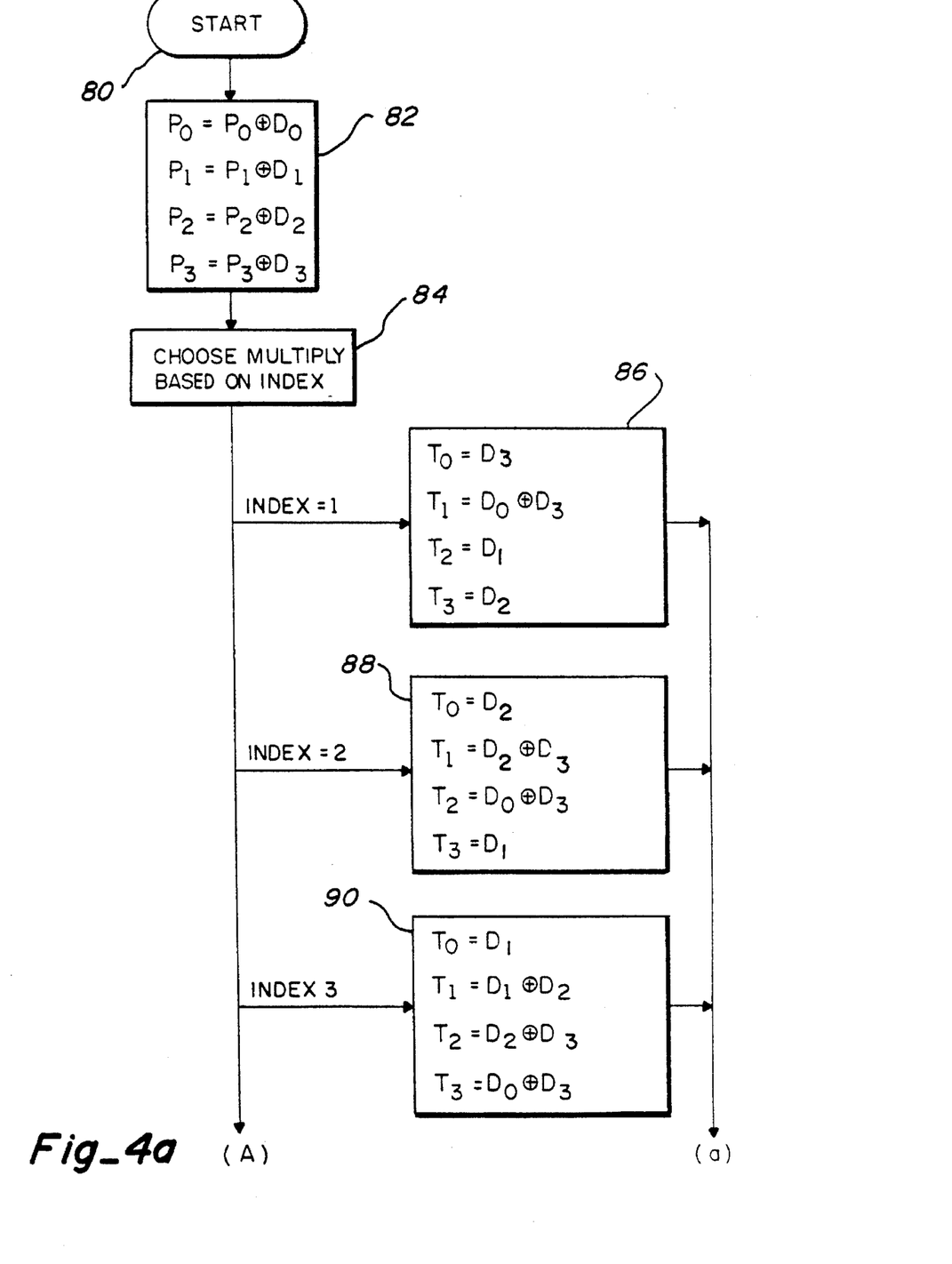
FIGS. 4a, 4b, 4c, and 4d are an illustration of a symbol transformation in accordance with another method of the present invention for computing RAID 6 check codes in a small Transposed Galois Field TGF($2^4$) with a generator polynomial of $X^4+X+1$.
Figure 4B:
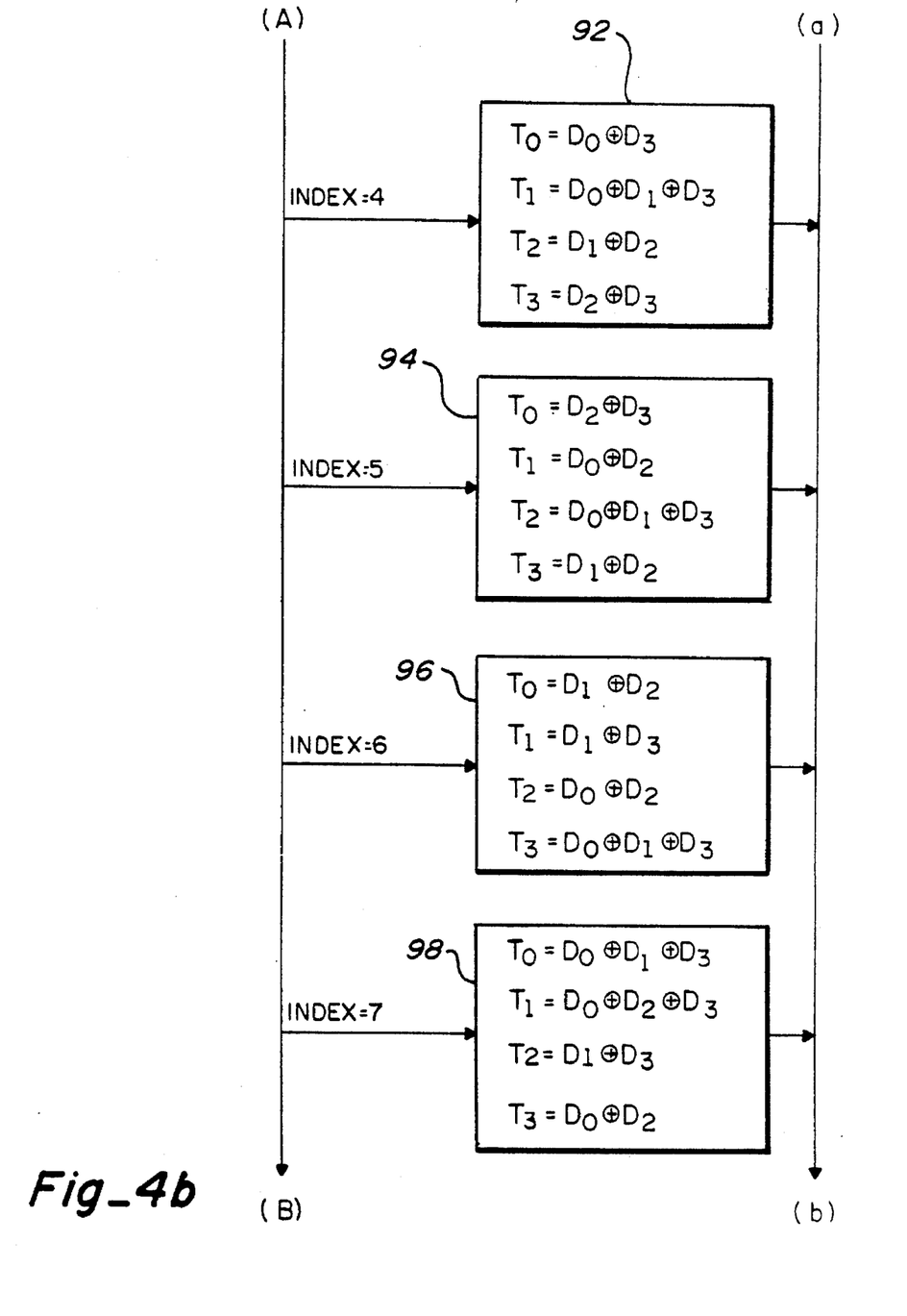
Figure 4C:
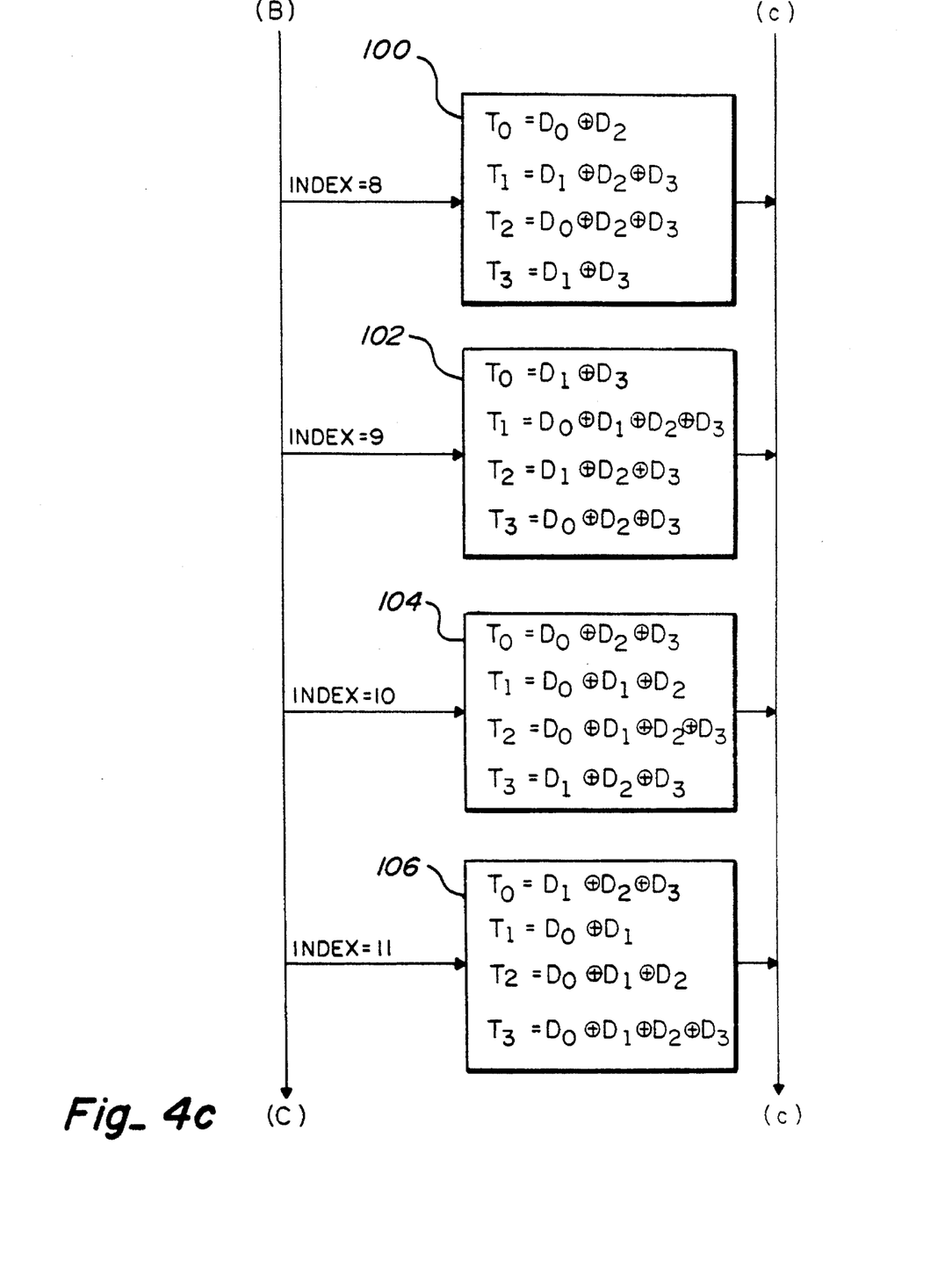
Figure 4D:
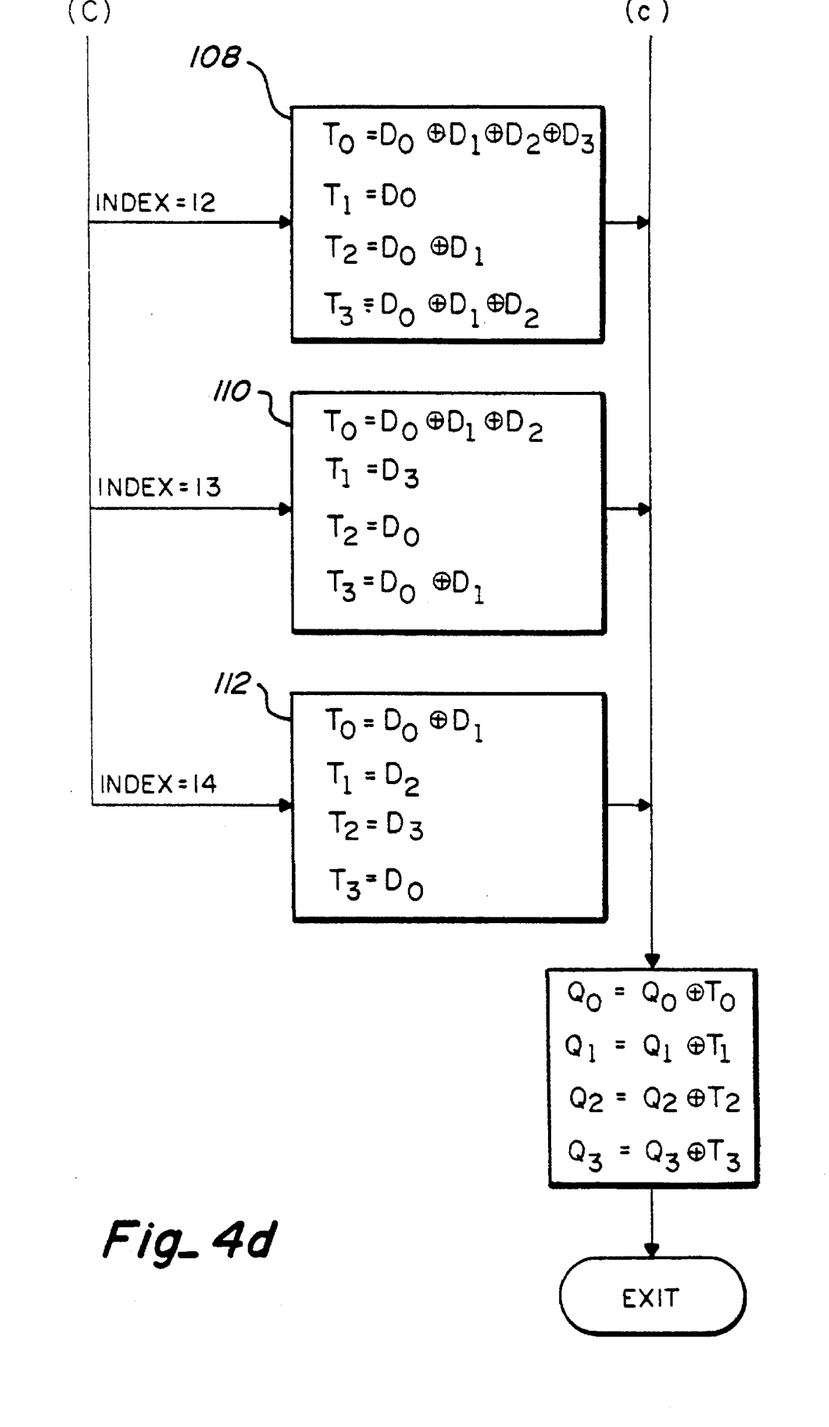

With reference additionally now to FIG. 3, the transformation operation 66 shown in FIG. 2 is illustrated in more detail. The transformation operation 66 shown, as an example only, utilizes a generator polynomial $G=X^{64}+X^4+1$ with a disk index K=7.

In this instance, P check symbol difference 58 comprises a 64 bit symbol (bits 00–63) representing a portion of the XOR result of new and old data in a sector as previously described. In transformation operation 66, the K (or 7 in the illustrative example) uppermost bits (bits 57–63) in P check symbol difference 58 are left rotated to assume the 7 lowermost bit positions previously held by bits 00–06 prior to the rotation, while bits 0–56 are shifted left 7 places. The 7 rotated bits are then left shifted D (or 4) bits and XORed into the result of the prior rotate operation. As a result, the Q check symbol difference 68 has as its four lowermost bits, the first four wraparound bits (bits 57–60). The next 7 bits are the XOR of the 7 uppermost bits (bits 57–63) of the P check symbol difference 58 with bits 61–64 and 00–03 respectively, while the remaining uppermost bits comprise bits 04–56.

Relaxation of the irreducibility requirement on the generator polynomial G, as previously described, allows a very simple G to be used as shown in FIG. 3, namely $G=X^{64}+X^4+1$, although unfortunately, the ultimately simple polynomial $G=X^{64}+1$ does not meet even this relaxed constraint. Since the degree D of $G+X^{64}$ is 4, this polynomial and a 64-bit arithmetic path allows us to build RAID 6 sets of up to 64−D=60 data disks; since there are only three nonzero terms, multiplication by any $2^k$ for k<60 requires one shift followed by two shift-XOR operations or one rotate followed by a single shift-mask-XOR operation.

The following code fragment for the Alpha AXP™ computer is an exemplary code which updates the P and Q check symbols for a sector of data using 64 bit symbols in $UR(2^{64})$, given the logical difference (XOR) of the new data from the previous data in the sector:

```
;Enter with r1 → difference buffer, r2 → P check buffer,
r3 → Q check buffer,
; r0 = data disk Index for Q check symbol computation
(0 ≤ r0 ≤ 59).
      lda    r9,64(r31)   ;r9=number of quadwords in a sector
      subq   r9,r0,r10    ;compute 64 - Index for loop
10$:  ldq    r4,0(r1)     ;get next difference symbol
                           (quadword)
      addq   r1,#8,r1     ;bump difference buffer pointer
      ldq    r7,0(r2)     ;get next P check symbol
      xor    r4,r7,r7     ;accumulate P check symbol
      stq    r7,0(r2)     ;store P check symbol
      addq   r2,#8,r2     ;bump P check symbol pointer
      sll    r4,r0,r5     ;start mult of diff symbol by 2^ Index
                           with a shift
      srl    r4,r10,r6    ;get overflow from shift
      xor    r6,r5,r5     ;correct for the "1" in X^64 + X^4 +1
      sll    r6,#4,r6     ;mult overflow by X^4 (Index < 60 so
                           no overflow)
      xor    r6,r5,r5     ;correct for the "X^4" in X^64 + X^4 + 1
      ldq    r8,0(r3)     ;get next Q check symbol
      xor    r5,r8,r8     ;accumulate Q check symbol
      stq    r8,0(r3)     ;store Q check symbol
      addq   r3,#8,r3     ;bump Q check symbol pointer
      subq   r9,#1,r9     ;decrement quadword count
      bne    r9,10$       ;and loop
```

Because Alpha AXP™ provides the proper types of 64-bit logical shift operations, the code to compute the new Q check symbol is only five instructions longer than that necessary to compute the new P check symbol. In practice, it should be possible to obscure most of this extra computation for the new Q check symbol under the memory references which fetch the data symbols and fetch and store the P and Q symbols. This should result in a RAID 6 computational burden for write operations which is less than double the RAID 5 burden (since the check symbol difference is only being fetched once to do both check code calculations).

The following code fragment for the VAX® computer updates the P and Q check symbols for a sector of data using 32 bit symbols in $UR(2^{32})$ with the generator polynomial $G=X^{32}+X^2+1$; this makes good use of the VAX® instruction set but is limited to RAID 6 arrays of 30 data disks. Note that there are no irreducible polynomials of degree 32 with two, three, or four non-zero coefficients, but $X^{32}+X^2+1$ meets the relaxed criteria for a $UR(2^{32})$ generator.

```
;Enter with R1 → difference buffer, R2 → P check buffer,
R3 → Q check buffer,
;R0 = data disk Index for Q check symbol computation
(0≤R0≤29).
      MOVL    #128.,R11     ;Get longword count into R11
      ROTL    R0,#1,R9      ;Get BIC mask for isolating
                             overflow bits
      MNEGL   R9,R9         ;of rotated difference symbols
10$:  MOVL    (R1)+,R4      ;(R4,R5)gets next two difference
                             symbols
      XORL2   R4,(R2)+      ;Update P check symbol
      ROTL    R0,R4,R6      ;R6←first diff symbol*2^ Index
                             mod X^32 +1
      BICL3   R9,R6,R4      ;Isolate rotated symbol
                             overflow bits
      ASHL    #2,R4,R4      ;multiply symbol overflow bits
                             by X^2
      XORL2   R4,R6         ;Correct symbol for "X^2" in
                             X^32 + X^2 + 1
      XORL2   R6,(R3)+      ;Update Q check symbol
      SOBGTR  R11,10$       ;Loop for all longwords
```

This code is quite efficient, taking only four more arithmetic instructions per 32 bit symbol to compute Q than to compute P.

Thus far, a data symbol has always been defined as a contiguous set of bits in the data stream. There are advantages, however, to defining interleaved or "transposed" data symbols. With transposed data symbols bit 0 of the data stream is, as before, bit 0 of symbol 0; however, instead of bit 1 of the data stream being bit 1 of symbol 0, it is bit 0 of symbol 1. Bit T (where T is the "transpose factor") of the data stream is bit 1 of symbol 0, bit T+1 of the data stream is bit 1 of symbol 1, bit 2T of the data stream is bit 2 of symbol 0, etc. After NT bits have been assigned this way, there are T N-bit symbols defined and the assignment continues with the next bit (bit NT) assigned to bit 0 of symbol T. A block of NT data bits is known as a "transposition block."

For sake of clarity, the following represents a map of a set of "normal" 8-bit symbols in 32-bit words using standard little-endian notation (i.e. bit numbers increase from right to left and top to bottom);

```
31                                              0
| Symbol 03 | Symbol 02 | Symbol 01 | Symbol 00 | A:
| Symbol 07 | Symbol 06 | Symbol 05 | Symbol 04 |
| Symbol 11 | Symbol 10 | Symbol 09 | Symbol 08 |
| Symbol 15 | Symbol 14 | Symbol 13 | Symbol 12 |
| Symbol 19 | Symbol 18 | Symbol 17 | Symbol 16 |
| Symbol 23 | Symbol 22 | Symbol 21 | Symbol 20 |
| Symbol 27 | Symbol 26 | Symbol 25 | Symbol 24 |
| Symbol 31 | Symbol 30 | Symbol 29 | Symbol 28 | A+28:
```

The following is a map of the equivalent "transposed" symbols with transpose factor 32:

```
31                                                                               0
|s|s|s|s|s|s|s|s|s|s|s|s|s|s|s|s|s|s|s|s|s|s|s|s|s|s|s|s|s|s|s|s| A:
|y|y|y|y|y|y|y|y|y|y|y|y|y|y|y|y|y|y|y|y|y|y|y|y|y|y|y|y|y|y|y|y|
|m|m|m|m|m|m|m|m|m|m|m|m|m|m|m|m|m|m|m|m|m|m|m|m|m|m|m|m|m|m|m|m|
|b|b|b|b|b|b|b|b|b|b|b|b|b|b|b|b|b|b|b|b|b|b|b|b|b|b|b|b|b|b|b|b|
|o|o|o|o|o|o|o|o|o|o|o|o|o|o|o|o|o|o|o|o|o|o|o|o|o|o|o|o|o|o|o|o|
|1|1|1|1|1|1|1|1|1|1|1|1|1|1|1|1|1|1|1|1|1|1|1|1|1|1|1|1|1|1|1|1|
| | | | | | | | | | | | | | | | | | | | | | | | | | | | | | | | |
|3|3|2|2|2|2|2|2|2|2|2|2|1|1|1|1|1|1|1|1|1|1|0|0|0|0|0|0|0|0|0|0|
|1|0|9|8|7|6|5|4|3|2|1|0|9|8|7|6|5|4|3|2|1|0|9|8|7|6|5|4|3|2|1|0| A+28:
```

Using transposed symbols with a transpose factor equal to the word size of the target computer has some useful properties. As in the contiguous symbol case, we can use transposed symbols in a small Galois Field (TGF) or in a large Useful Ring (TUR).

The advantage of using a small TGF($2^N$), N=4 or 8, is that an entire transposition block of T N-bit symbols can fit into N registers in the computer data path; on the other hand, the $\alpha^K$ multipliers cannot be restricted to the simple $X^K$ terms, so the multiplications require more complex sets of XORs between those registers.

In a large TUR($2^N$), we need only to be able to multiply by $X^K$. With contiguous symbols this is done by performing a left rotate of K places and then shifting the wrap-around bits left M bits and XORing them into the result of the rotate, as previously disclosed; M in this case is the degree of $G+X^N$. With transposed symbols the equivalent operation is to logically rotate the block by K words via renumbering the words in the block, and then XOR word j of the (renumbered) block with word j+M for $0 \leq j < K$ as will be described hereinafter in more detail with respect to a specific example illustrated in FIG. 5. With the simplest coding of this algorithm, N registers would be required to hold all the symbols of a transposition block, which most computers do not have. Inasmuch as it is desirable to minimize memory references by fetching each data symbol exactly once, the code can be unrolled and structured so as to require only M registers for holding symbols.

The transposed symbol algorithms do present some currently anticipated compromises.

It is difficult to efficiently code the multiplies by $\alpha^K$ for general K, because of the arbitrary polynomials (in the TGF case) or the arbitrary renumberings of the words of the block (in the TUR case); at present, the best solution appears to be to code a separate, optimized multiply routine for every K; that is, each data disk in the RAID set would have its own check code update routine.

Similarly, the general multiplication used to reconstruct data after failures cannot use any tables, because table indexing by symbols whose bits are stored noncontiguously is very difficult. Again, the best solution appears to be to code each multiply by $(\alpha^j+\alpha^k)^{-1}$ as a separate optimized routine. This is especially easy in TGF($2^4$), since these are the same multipliers used to compute the check codes in the first place and there are only 15 nonzero symbols. For TGF($2^8$) and all the TUR's there are considerably more routines to code. In fact, for a large TUR it may be best to write routines to multiply by $(\alpha^j+1)^{-1}$ and $\alpha^{-k}$, and do two multiplies to recover from double failures.

With reference to FIGS. 4a–4d, a method for computing check codes in a small transposed Galois field TGF($2^4$) is shown utilizing a generator polynomial of $G=X^4+X+1$. As utilized with respect to these figures, $D_{0-3}$ contains the data difference symbols; $P_{0-3}$ contains the P check code symbols; $Q_{0-3}$ contains the Q check code symbols; and $T_{0-3}$ are temporary variables holding the Q check code difference symbols.

The method begins at start 80 and proceeds to step 82 where the P check code symbols are updated as follows: $P_0$ is set equal to $P_0 \oplus D_0$; $P_1$ is set equal to $P_1 \oplus D_1$; $P_2$ is set equal to $P_2 \oplus D_2$; and $P_3$ is set equal to $P_3 \oplus D_3$. At step 84 the multiplication operation to follow is chosen based upon the selected index K, where K is the number of the physical disk on which the data resides. Therefore, if K=1, the temporary variables $T_0$-$T_3$ are set as follows: $T_0 = D_3$; $T_1 = D_0 \oplus D_3$; $T_2 = D_1$; and $T_3 = D_2$ at step 86. In like manner, the following multiplication operations will pertain depending on the index K:

| Step | Index | Temporary Variables ($T_0$-$T_3$) |
|---|---|---|
| 88  | 2  | $T_0=D_2$; $T_1=D_2\oplus D_3$; $T_2=D_0\oplus D_3$; $T_3=D_1$ |
| 90  | 3  | $T_0=D_1$; $T_1=D_1\oplus D_2$; $T_2=D_2\oplus D_3$; $T_3=D_0\oplus D_3$ |
| 92  | 4  | $T_0=D_0\oplus D_3$; $T_1=D_0\oplus D_1\oplus D_3$; $T_2=D_1\oplus D_2$; $T_3=D_2\oplus D_3$ |
| 94  | 5  | $T_0=D_2\oplus D_3$; $T_1=D_0\oplus D_2$; $T_2=D_0\oplus D_1\oplus D_3$; $T_3=D_1\oplus D_2$ |
| 96  | 6  | $T_0=D_1\oplus D_2$; $T_1=D_1\oplus D_3$; $T_2=D_0\oplus D_2$; $T_3=D_0\oplus D_1\oplus D_3$ |
| 98  | 7  | $T_0=D_0\oplus D_1\oplus D_3$; $T_1=D_0\oplus D_2\oplus D_3$; $T_2=D_1\oplus D_3$; $T_3=D_0\oplus D_2$ |
| 100 | 8  | $T_0=D_0\oplus D_2$; $T_1=D_1\oplus D_2\oplus D_3$; $T_2=D_0\oplus D_3$; $T_3=D_1\oplus D_3$ |
| 102 | 9  | $T_0=D_1\oplus D_3$; $T_1=D_0\oplus D_1\oplus D_2\oplus D_3$; $T_2=D_1\oplus D_2\oplus D_3$; $T_3=D_0\oplus D_2\oplus D_3$ |
| 104 | 10 | $T_0=D_0\oplus D_2\oplus D_3$; $T_1=D_0\oplus D_1\oplus D_2$; $T_2=D_0\oplus D_1\oplus D_2\oplus D_3$; $T_3=D_1\oplus D_2\oplus D_3$ |
| 106 | 11 | $T_0=D_1\oplus D_2\oplus D_3$; $T_1=D_0\oplus D_1$; $T_2=D_0\oplus D_1\oplus D_2$; $T_3=D_0\oplus D_1\oplus D_2\oplus D_3$ |
| 108 | 12 | $T_0=D_0\oplus D_1\oplus D_2\oplus D_3$; $T_1=D_0$; $T_2=D_0\oplus D_1$; $T_3=D_0\oplus D_1\oplus D_2$ |
| 110 | 13 | $T_0=D_0\oplus D_1\oplus D_2$; $T_1=D_3$; $T_2=D_0$; $T_3=D_0\oplus D_1$ |
| 112 | 14 | $T_0=D_0\oplus D_1$; $T_1=D_2$; $T_2=D_3$; $T_3=D_0$ |

The temporary variables ($T_0$-$T_3$) are then used to update the Q check code symbols ($Q_0$-$Q_3$) at step 114 as follows: $Q_0 = Q_0 \oplus T_0$; $Q_1 = Q_1 \oplus T_1$; $Q_2 = Q_2 \oplus T_2$; and $Q_3 = Q_3 \oplus T_3$ to end the check code computation at exit step 116.

The following VAX® code fragment updates P and Q check codes for a sector of data using the $GF(2^4)$ defined by the generator polynomial $X^4+X+1$, using transposed symbols with a transpose factor of 32; that is, a transposition block size of 32*4=128 bits or 16 bytes. This routine is specific to the index whose corresponding polynomial is $X^2+1$; if $\alpha = X$, this routine is specific to the index K=8, since $X^8 = X^2+1 \mod X^4+X+1$. Multiplication by $X^2+1$ in this Galois Field transforms a polynomial of the form $ax^3+bX^2+cX+d$ into one of the form $(a+c)X^3+(a+b+d)X^2+(a+b+c)X+(b+d)$ as shown with respect to step 100 of FIGS. 4a–4d.

```
;Enter with R1 → difference buffer, R2 → P check buffer,
R3 → Q check buffer,
;This is the unique check code update routine for disk index K
where α^x = X^2 + 1.
         MOVL    #32.,R11      ;Get octaword count into R11
10$:     MOVQ    (R1)+,R4      ;Get an octaword (32 4-bit
                                 transposed symbols)
         MOVQ    (R1)+,R6      ;into R4-R7;R4=d,R5=c,
                                 R6=b,R7=a
         XORL2   R4,(R2)+      ;Update P check code octaword
         XORL2   R5,(R2)+
         XORL2   R6,(R2)+
         XORL2   R7,(R2)+
         XORL2   R6,R4         ;R4 gets b+d
         XORL2   R7,R5         ;R5 gets a+c
         XORL2   R5,R6         ;R6 gets a+b+c
         XORL2   R4,R7         ;R7 gets a+b+d
         XORL2   R4,(R3)+      ;Update Q check code octaword
         XORL2   R6,(R3)+
         XORL2   R7,(R3)+
         XORL2   R5,(R3)+
         SOBGTR  R11,10$       ;Loop for all octawords
```

Note that a VAX® computer has sufficient registers to perform this computation straightforwardly in $TGF(2^4)$ with transpose factor 64, or in $TGF(2^8)$ with transpose factor 32. To perform this computation on a VAX® in $TGF(2^8)$ with transpose factor 64, it would be best to process the even and odd longwords of the sector separately to conserve VAX® registers.

Figure 5:
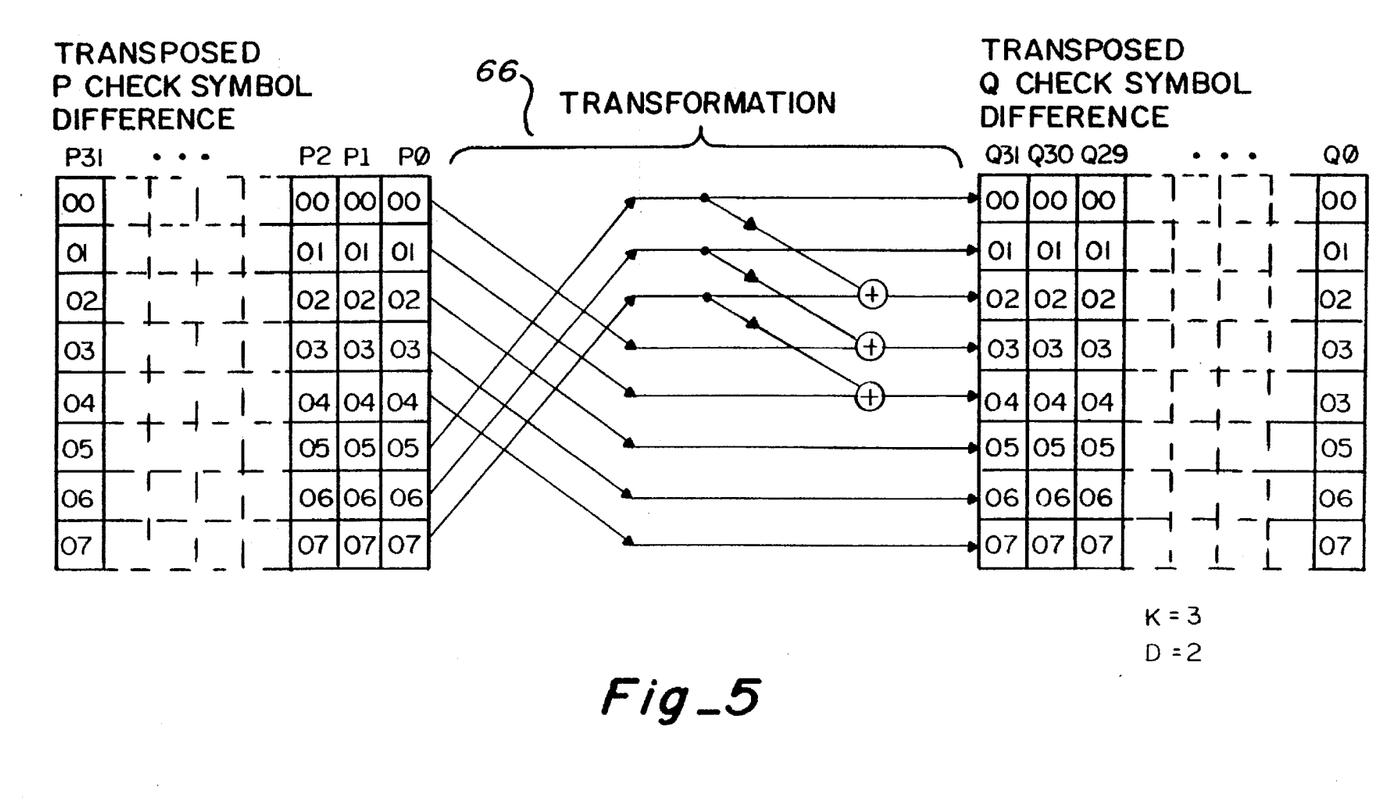
FIG. 5 is a representative illustration of a transformation operation in accordance with the present invention utilizing transposed 8 bit symbols with a transpose factor of 32 in TGF($2^4$) with an index K=3 and a degree M=2.

With respect to FIG. 5, an exemplary illustration is shown in which contiguous 8 bit symbols in a data stream have been transposed to form a transposition block utilizing a transpose factor of 32 on a computer with a word size of 32 bits. As shown, the transformation 66 of the present invention serves to transform a P check symbol difference to a Q check symbol difference for updating RAID 6 check codes in accordance with the present invention.

As above described, bit 00 of symbol P0 in the data stream remains as bit 00 of the first word of the eight word transposition block while bit 00 of symbol P1 in the data stream becomes bit 01 of the first word and so on. The transposed P check symbol difference then comprises the eight word transposition block shown with the renumbering being equivalent to left rotation. The transformation 66 from the transposed P check symbol difference to a transposed Q check symbol difference can then be undertaken in only eight computational operations.

Utilizing an index K=3 (representing the physical disk of the RAID 6 array on which the data resides) and an illustrative polynomial $G = X^8 + X^2 + 1$ such that the degree D of $G+X^8$ is 2, the third, fourth and fifth words of the transposed P check symbol difference become the sixth, seventh and eighth words of the transposed Q check symbol difference. Similarly, the sixth and seventh words of the transposed P check symbol difference become the first and second words of the transposed Q check symbol difference. The "wrap around" sixth, seventh and eighth words of the transposed P check symbol difference are then XORed with the eighth, first and second 32 bit words of the transposed P check symbol difference respectively, to constitute the third, fourth and fifth words of the transposed Q check symbol difference.

The following VAX® code fragment updates P and Q check codes for a sector of data using the $UR(2^{16})$ defined by the generator polynomial $X^{16}+X+1$, using transposed 16 bit symbols with a transpose factor of 32 (i.e. a transposition block size of 64 bytes). The generator polynomial $X^{16}+X+1$ meets the conditions for a Useful Ring generator and allows the same limit of 15 data disks as the $GF(2^4)$ implementation. Larger polynomials like $X^{64}+X^4+1$ can be used to handle more data disks at a cost in code complexity, but no cost in execution speed. The code below is specific to disk index K, K>1, and uses a variant of the rotate-mask-shift-XOR code used previously, using circular offset addressing as the analogy of rotation.

```
;Enter with R1 → difference buffer, R2 → P check buffer, R3 → Q check buffer
;This is the unique check code update routine for disk index K.
        MOVL    #8.,R11          ;Get transposition block count into R11
10$:    ADDL2   #(16-K)*4,R1     ;Bump diff pointer to symbol bit 16-K (P ptr follows)
        ADDL2   #(16-K)*4,R2     ;16-K is the first bit to wrap around in rotate
        CLRL    R5               ;Clear previous wraparound bit register
        MOVL    #K,R6            ;Get loop for wraparound terms
20$:    MOVL    (R1)+,R4         ;Get bit K+L of every symbol
        XORL2   R4,(R2)+         ;Update P check code
        XORL2   R4,R5            ;XOR bit with prev wraparound bit (bit K+L−1)
        XORL2   R5,(R3)+         ;Update bit L of each symbol in Q check code
        MOVL    R4,R5            ;Save these bits as the previous wraparound bits
        SOBGTR  R6,20$           ;Loop for L = 0 to K
        SUBL3   #16*4,R1,R8      ;Point temp diff ptr to beginning of block
        SUBL3   #16*4,R2,R9      ;P pointer follows, of course
        MOVL    (R8)+,R5         ;Get longword with bit 0 of every symbol
        XORL2   R5,(R9)+         ;Update P check code
        XORL2   R4,R5            ;XOR with lwd containing bit 15 of every symbol
        XORL2   R5,(R3)+         ;Update bit K of Q check code
        MOVL    #15-K,R6         ;Get count for rest of longwords
30$:    MOVL    (R8)+,R4         ;Get bit M of every symbol
        XORL2   R4,(R9)+         ;Update P check code
        XORL2   R4,(R3)+         ;Update bit K+M of Q check code
        SOBGTR  R6,30$           ;Loop for M = 1 to 15-K
        SOBGTR  R11,10$          ;Loop for all transposition blocks in the sector
```

Performance Measurements

The previous VAX® code fragments, plus a straight RAID 5 code fragment and two code fragments which implement hardware-like RAID 6 algorithms directly in software, were implemented in VAX® MACRO. Their performance was measured on a VAX® 4000 model 300 and a VAX® 6000 model 610 for a large (64KB) buffer of P check symbol differences. The implementations were all optimized for best VAX® performance, including some loop unrolling for small loops. Each test was image activated three times and run three times (with three different disk indexes) per activation; the times were then averaged to eliminate performance differences (observed up to 7%) due to translation buffer interference based on image placement. The results of the performance tests are contained in the following table:

tion table sizes. The $UR(2^{64})$ implementation on VAX® is about 2.4–2.9 times slower than a RAID 5 implementation. Alpha AXP™ code has not yet been measured, but it is expected that the architecture and implementation of Alpha AXP™ are more favorable to the $UR(2^{64})$ algorithm relative to both RAID 5 and the $GF(2^8)$ algorithms. It is expected that performance of the $UR(2^{64})$ algorithm will be within a factor of two of the RAID 5 algorithm on Alpha AXP™; in fact, they should theoretically run approximately 1.67 times slower than RAID 5, as this is the ratio of the memory references made by these algorithms.

The implementations using transposed symbols are even faster, performing within a factor of 2 of the RAID 5 implementation even on VAX®; however, they should lose most of their advantage relative to the contiguous algorithms on Alpha AXP™, as both algorithms make the same number

| RAID CHECK CODE UPDATE ALGORITHM | TIME TO PROCESS 64k BLOCK, ms | | RATIO OF TIME TO RAID 5 TIME | |
|---|---|---|---|---|
| | 4000/300 | 6000/610 | 4000/300 | 6000/610 |
| Prior Art: | | | | |
| RAID 5 (P disk only) | 9.52 | 1.75 | 1.00 | 1.00 |
| RAID 6 in $GF(2^4)$, ≦15 disks | 69.80 | 18.80 | 7.33 | 10.70 |
| RAID 6 in $GF(2^8)$, ≦255 disks | 44.20 | 11.20 | 4.64 | 6.38 |
| Useful Ring Computations: | | | | |
| RAID 6 in $UR(2^{32})$, ≦30 disks | 22.40 | 4.47 | 2.35 | 2.55 |
| RAID 6 in $UR(2^{64})$, ≦60 disks | 26.10 | 5.12 | 2.74 | 2.92 |
| Transposed Symbol Computations: | | | | |
| RAID 6 in $TGF(2^4)$, ≦15 disks | 17.30 | 3.36 | 1.82 | 1.92 |
| RAID 6 in $TUR(2^{16})$, ≦15 disks | 18.70 | 3.39 | 1.97 | 1.94 |

Conclusions and Extrapolations

Among implementations using contiguous symbols, the best $UR(2^{64})$ implementation is approximately 2–3 times as fast on a VAX® as a straight software implementation of the hardware $GF(2^4)$ RAID 6 algorithm, and about 2–2.5 times as fast as an implementation in $GF(2^8)$. Implementations in Fields larger than $GF(2^8)$ suffer from unwieldy multiplicaof memory references. Transposed symbol implementations may incur extra overhead in heterogeneous systems where the algorithms are implemented either on multiple architectures or on a mix of hardware and software platforms.

While there have been described above, the principles of the present invention in conjunction with specific systems and methods, it is to be clearly understood that the foregoing description is made only by way of example and not as a limitation to the scope of the invention as described in the following claims.

What is claimed is:

1. A method for updating RAID 6 check codes by transforming a first check symbol difference to a second check symbol difference comprising the steps of:

establishing a generator polynomial of the form $G=X^N+X^D+1$;

selecting an index K;

renumbering said first check symbol difference by K bits to define a renumbered check symbol difference;

calculating a logical difference of each of said first K bits of said renumbered check symbol difference with each of another K bits of said renumbered check symbol difference thereof forming a resultant K bits of said renumbered check symbol difference starting at bit position D; and defining said second check symbol difference by said renumbered check symbol difference inclusive of said resultant K bits.

2. The method of claim 1 wherein said K bits of said first check symbol difference are uppermost bits thereof.

3. The method of claim 2 wherein said K uppermost bits are renumbered as K lowermost bits of said renumbered check symbol difference.

4. The method of claim 1 wherein said index K identifies a physical storage element on which data related to said first and second check symbol differences resides.

5. The method of claim 1 wherein said generator polynomial is equal to $X^{64}+X^4+1$.

6. The method of claim 5 wherein said index K is greater than or equal to zero and less than or equal to 59.

7. The method of claim 1 wherein said generator polynomial is equal $X^{32}+X^2+1$.

8. The method of claim 7 wherein said index K is greater than or equal to zero and less than or equal to 29.

9. The method of claim 1 wherein N>>D.

10. The method of claim 1 wherein said step of calculating is carried out by XORing each of said first renumbered K bits of said renumbered check symbol difference with each of another K bits starting at bit position D respectively.

11. The method of claim 1 wherein said step of renumbering is carried out by a left rotate of said first check symbol difference by K bit positions such that K most significant bits of said first check symbol difference move to K least significant bits of said renumbered check symbol difference.

12. The method of claim 1 further comprising the step of:

constructing a RAID 6 storage array of no more than N–D storage devices.

13. The method of claim 1 further comprising the step of:

transposing data symbols in a data stream defining said first check symbol difference to a transposition block having a transpose factor T prior to said step of renumbering.

14. The method of claim 13 wherein T is equal to the word size of a computer for performing said method.

15. The method of claim 14 wherein T=32.

16. The method of claim 14 wherein T=64.

17. The method of claim 13 wherein said step of transposing is carried out by renumbering bits of said data symbols in said data stream.

18. A system for updating RAID 6 check codes by transforming a first check symbol difference to a second check symbol difference comprising:

means for establishing a generator polynomial of the form $G=X^N+X^D+1$;

means for selecting an index K;

means for renumbering said first check symbol difference by K bits to define a renumbered check symbol difference;

means for calculating a logical difference of each of said first K bits of said renumbered check symbol difference with each of another K bits of said renumbered check symbol difference starting at bit position D within said renumbered check symbol difference thereof forming a resultant K bits of said renumbered check symbol difference; and means for defining said second check symbol difference by said renumbered check symbol difference inclusive of said resultant K bits thereof.

19. The system of claim 18 wherein said K bits of said first check symbol difference are uppermost bits thereof.

20. The system of claim 19 wherein said K uppermost bits are renumbered as K lowermost bits of said renumbered check symbol difference.

21. The system of claim 18 wherein said index K identifies a physical storage element on which data related to said first and second check symbol differences resides.

22. The system of claim 18 wherein said generator polynomial is equal to $X^{64}+X^4+1$.

23. The system of claim 22 wherein said index K is greater than or equal to zero and less than or equal to 59.

24. The system of claim 18 wherein said generator polynomial is equal $X^{32}+X^2+1$.

25. The system of claim 24 wherein said index K is greater than or equal to zero and less than or equal to 29.

26. The system of claim 18 wherein N>>D.

27. The system of claim 18 wherein said calculating means comprises means for XORing each of said first renumbered K bits of said renumbered check symbol difference with each of said another K bits starting at bit position D respectively.

28. The system of claim 18 wherein said renumbering means comprises means for performing a logical left rotate of said first check symbol difference by K bit positions such that K most significant bits of said first check symbol difference move to K least significant bits of said renumbered check symbol difference.

29. The system of claim 18 further comprising:

means for transposing data symbols in a data stream defining said first check symbol difference to a transposition block having a transpose factor T.

30. The system of claim 29 wherein T is equal to the word size of a computer comprising said system.

31. The system of claim 30 wherein T=32.

32. The system of claim 30 wherein T=64.

33. The system of claim 29 wherein said transposing means comprises means for renumbering bits of said data symbols in said data stream.

34. The system of claim 18 comprising a a RAID 6 storage array of no more than N–D storage devices.

35. A computer system including a RAID 6 storage array comprising a plurality of physical storage devices for storing data symbols and first and second check symbols for reconstructing said data symbols thereon, said computer system further comprising a data processor for recomputing said first and second check symbols in response to changes in said data symbols, said computer system comprising:

means for determining first check symbol differences in response to changes in said data symbols;

means for updating said first check symbols based upon said first check symbol differences;

means for establishing a generator polynomial of the form $G=X^N+X^D+1$;

means for selecting an index K;

means for renumbering said first check symbol differences by K bits to define renumbered check symbol differences;

means for calculating a logical difference of each of said first K bits of each of said renumbered check symbol differences with each of another K bits of said renumbered check symbol differences starting at bit position D within said renumbered check symbol differences thereof forming a resultant K bits of said renumbered check symbol differences starting at bit position D;

means for defining said second check symbol differences by said renumbered check symbol differences inclusive of said resultant K bits;

means for updating said second check symbols based upon said second check symbol differences;

means for writing said changed data symbols and said first and second check symbols to said storage array.

36. The computer system of claim 35 wherein said determining means comprises means for XORing an old data symbol with a new data symbol to determine said first check symbol difference.

37. The computer system of claim 35 wherein said first check symbol difference is a P check symbol difference within a P+Q RAID 6 implementation.

38. The computer system of claim 35 wherein said index K is related to the physical storage device of said storage array on which said data symbols reside.

39. The computer system of claim 35 wherein said second check symbol difference is a Q check symbol difference within a P+Q RAID 6 implementation.

40. The computer system of claim 35 wherein said K uppermost bits are renumbered as K lowermost bits of said renumbered check symbol differences.

41. The computer system of claim 35 wherein said generator polynomial is equal to $X^{64}+X^4+1$.

42. The computer system of claim 35 wherein said generator polynomial is equal $X^{32}+X^2+1$.

43. The computer system of claim 35 wherein $N \gg D$.

44. The computer system of claim 35 wherein said calculating means comprises means for XORing each of said first renumbered K bits of said renumbered check symbol differences with each of said another K bits starting at bit position D respectively.

45. The computer system of claim 35 wherein said renumbering means comprises means for performing a logical left rotate of said first check symbol difference by K bit positions such that K most significant bits of said first check symbol differences move to K least significant bits of said renumbered check symbol differences.

46. The computer system of claim 35 further comprising:

means for transposing data symbols in a data stream defining said first check symbol differences to transposition blocks having a transpose factor T.

47. The computer system of claim 46 wherein T is equal to the word size of said data processor.

48. The computer system of claim 47 wherein T=32.

49. The computer system of claim 47 wherein T=64.

50. The computer system of claim 46 wherein said transposing means comprises means for renumbering bits of said data symbols in said data stream.

51. The system of claim 35 comprising a a RAID 6 storage array of no more than N–D storage devices.

* * * * *